US011940923B1

(12) United States Patent
Samnick et al.

(10) Patent No.: US 11,940,923 B1
(45) Date of Patent: Mar. 26, 2024

(54) COST BASED CACHE EVICTION

(71) Applicant: Amazon Technologies, Inc., Seattle, WA (US)

(72) Inventors: Andrew Samnick, Seattle, WA (US); Jacob Shannan Carr, Seattle, WA (US); Sean Robert Connell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 441 days.

(21) Appl. No.: 16/711,296

(22) Filed: Dec. 11, 2019

(51) Int. Cl.
*G06F 12/0891* (2016.01)
*G06F 9/30* (2018.01)
*G06F 9/54* (2006.01)
*G06F 11/30* (2006.01)
*G06F 11/34* (2006.01)
*G06F 12/121* (2016.01)
*G06F 12/123* (2016.01)
*G06F 12/128* (2016.01)
*H04L 67/1097* (2022.01)
*H04L 67/5682* (2022.01)

(52) U.S. Cl.
CPC ...... *G06F 12/0891* (2013.01); *G06F 9/30047* (2013.01); *G06F 9/546* (2013.01); *G06F 11/3037* (2013.01); *G06F 11/3442* (2013.01); *G06F 12/121* (2013.01); *G06F 12/123* (2013.01); *G06F 12/128* (2013.01); *H04L 67/1097* (2013.01); *H04L 67/5682* (2022.05); *G06F 2201/81* (2013.01); *G06F 2201/885* (2013.01)

(58) Field of Classification Search
None
See application file for complete search history.

(56) References Cited

U.S. PATENT DOCUMENTS

2002/0035672 A1* 3/2002 Challenger ........... G06F 12/121
711/122
2002/0099807 A1* 7/2002 Doyle ................ G06F 16/9574
709/223

(Continued)

OTHER PUBLICATIONS

William Pugh. "An Improved Replacement Strategy for Function Caching." Jan. 1988. ACM. LFP '88. pp. 269-276.*

(Continued)

*Primary Examiner* — Nathan Sadler
(74) *Attorney, Agent, or Firm* — Robert C. Kowert; Kowert, Hood, Munyon, Rankin & Goetzel, P.C.

(57) ABSTRACT

Technologies are described for cost based management of cache entries stored in a computer memory. In one example, a plurality of cache entries may be stored at a cache in a computer memory and the cache entries may have a cost measure associated with individual cache entries. A cost measure may represent a computing cost of an application to generate a cache entry. An incoming cache entry may be received at the cache, where the incoming cache entry has a cost measure associated with the incoming cache entry. In response to receiving the incoming cache entry, a cache entry that has a lower cost measure than the cost measure for other cache entries may be identified for eviction from the cache. The cache entry identified for eviction may be evicted from the cache, and the incoming cache entry may be written into the cache stored in the computer memory.

21 Claims, 11 Drawing Sheets

(56) References Cited

U.S. PATENT DOCUMENTS

| | | | |
|---|---|---|---|
| 2003/0172236 A1* | 9/2003 | Iyengar | G06F 12/0811 |
| | | | 711/145 |
| 2014/0188656 A1* | 7/2014 | Puttaswamy Naga | |
| | | | G06Q 30/0631 |
| | | | 705/26.7 |
| 2016/0055100 A1* | 2/2016 | Loh | |
| 2017/0041428 A1* | 2/2017 | Katsev | G06F 12/0813 |
| 2017/0329720 A1* | 11/2017 | Bedi | G06F 12/0813 |
| 2018/0067869 A1* | 3/2018 | Yang | G06F 3/061 |
| 2018/0191857 A1* | 7/2018 | Schooler | |

OTHER PUBLICATIONS

Cao et al. "Cost-Aware WWW Proxy Caching Algorithms." Dec. 1997. Usenix. Usits.*

Li et al. "A Minimal Access Cost-Based Multimedia Object Replacement Algorithm." Mar. 2007. IEEE. IPDPS '07.*

Li et al. "GD-Wheel: A Cost-Aware Replacement Policy for Key-Value Stores." Apr. 2015. ACM. EuroSys'15.*

Xu et al. "Saving Energy on the Edge: In-Memory Caching for Multi-Tier Heterogeneous Networks." May 2018. IEEE. IEEE Communications Magazine. pp. 102-107.*

\* cited by examiner

Priority Queue (Total Cost) 506

| 1 | Data 112 | Cost Measure 114 | Frequency of Access 132 |
|---|---|---|---|
| 2 | Data 112 | Cost Measure 114 | Frequency of Access 132 |
| 3 | Data 112 | Cost Measure 114 | Frequency of Access 132 |
| 4 | Data 112 | Cost Measure 114 | Frequency of Access 132 |
| 5 | Data 112 | Cost Measure 114 | Frequency of Access 132 |
| 6 | Data 112 | Cost Measure 114 | Frequency of Access 132 |

Priority Queue (TTL) 508

| 1 | Data 112 | TTL |
|---|---|---|
| 2 | Data 112 | TTL |
| 3 | Data 112 | TTL |
| 4 | Data 112 | TTL |
| 5 | Data 112 | TTL |
| 6 | Data 112 | TTL = 0 |

510

Expulsion from Cache

FIG. 5B

COST BASED CACHE EVICTION

BACKGROUND

In computing systems, caching methods (also frequently called cache replacement algorithms or cache replacement policies) are optimizing instructions or methods that a computer program or a hardware-maintained structure can utilize in order to manage a cache of information stored on a computer. Caching often improves performance by keeping more recently used or often-used data items in memory locations that are faster to access than normal memory stores. When the cache is full, the process must choose which items to discard from the cache to make room for the new ones.

Commonly used cache eviction strategies are based on the access pattern of the data. For example, Least Recently Used (LRU) caches may prioritize keeping the items that have been accessed most recently and discarding cache entries that have not been used recently. As another example, Least Frequently Used (LFU) caches prioritize the items that are accessed most often and discard cache items that are not frequently used.

In other examples, caches may use a time driven approach where cache entries are evicted from a cache based on how long the cache entries have been in the cache. For example, in a FIFO (first in first out) cache, entries are evicted in the order the entries were added. A LIFO (last in first out) may operate in way that is the opposite of the FIFO queue. When using the LIFO process, the cache evicts the cache entry added most recently first without any regard to how often or how many times it was accessed before.

BRIEF DESCRIPTION OF THE DRAWINGS

FIG. 5B is a diagram illustrating an example of ranking cache entries using cost measure and evicting a high cost cache entry when a time to live (TTL) expires.

DETAILED DESCRIPTION

Figure 1A:
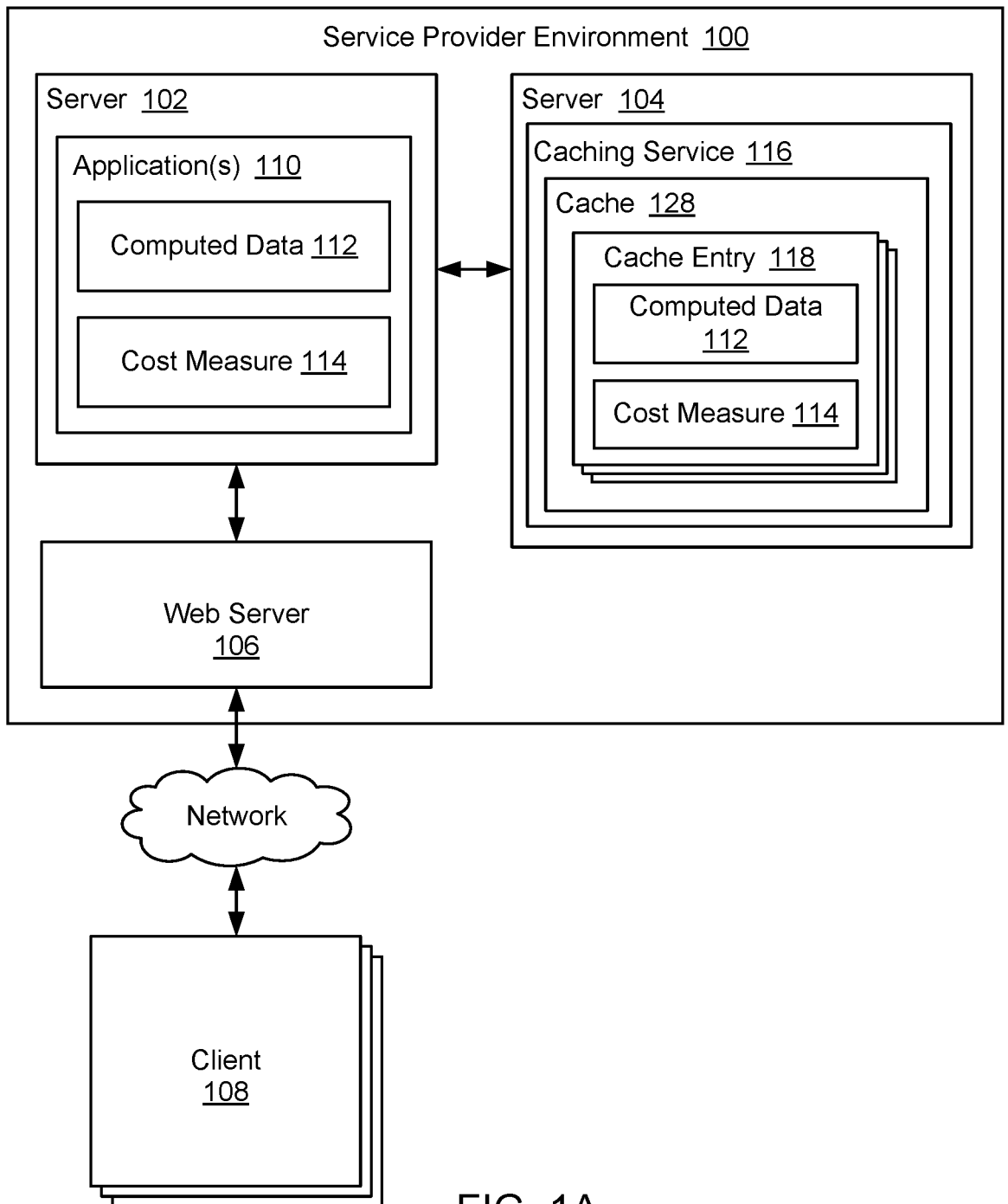
FIG. 1A is a block diagram illustrating one example of a system that includes a cache service to manage cache entries using cost measures that represent a cost associated with generating the individual cache entries.

Technologies are described for cost based management of cache entries stored in a computer memory. A cache may be a hardware or software data storage component that stores data to make the data available for future requests. Storing the data as a cache entry in a cache may decrease an amount of time or work needed to serve the data because the data is readily available in the cache. Because the size of a cache is limited, one or more cache entries may be evicted from the cache to allow an incoming cache entry to be stored to the cache. The technologies described herein identify a cache entry to evict from the cache using a cost measure.

A cost measure may represent an amount of computing resources used to generate data stored to a cache as a cache entry. For example, a cost measure may represent an amount of CPU (central processing unit), I/O (input/output), power consumption (e.g., electrical energy used by computing resources to generate the data), network bandwidth, GPU (graphics processing unit), other computing resources used to generate the data, a time to generate a cache entry, and/or an actual cost to generate a cache entry (e.g., a consumption cost associated with generating data, such as requests to metered and billed computing resources, an amount that is charged to perform an operation, or time spent by a user to provide user input). Other values that may be used to estimate a cost measure may be weighted data attributes from the computed data and/or a time to live (TTL). A cost measure can be calculated for a cache entry, and the cost measure and the cache entry may be provided to the cache for storage.

In one example, an application, process, service, or function that generates the data may calculate the cost measure for the data and provide the data and the cost measure to the cache. The cache entry may be prioritized or ranked for eviction from the cache based on the cost measure. As an illustration, an application may be configured to generate a webpage component which includes current purchasing recommendation information and the webpage component may be cached in cache. As part of generating the webpage component, the web application may calculate a cost measure associated with generating the webpage component. The cost measure may be based on an amount of I/O bandwidth used to retrieve the current information to include in the webpage component and an amount of CPU used to generate the webpage component. The application may then provide the webpage component and the cost measure to a cache. The webpage component may be prioritized in the cache based on the cost measure provided by the application.

In the event that an incoming cache entry is received at the cache and the cache is full, a cache entry may be identified for eviction from the cache to allow the incoming cache entry to be added to the cache. A cache entry that has a cost measure that is lower than cost measures of other cache entries may be identified, and the cache entry may be evicted from the cache to allow the incoming cache entry to be written to the cache. For example, the cache entries may be prioritized based on the cost measures associated with the cache entries. A cache entry prioritized for eviction may be identified, and the cache entry may be removed from the cache. The incoming cache entry may be added to the cache, and the cache entry may be prioritized in the cache based on a cost measure associated with the cache entry.

Cache eviction strategies have generally been based on an access pattern of data stored in a cache. For example, Least Recently Used (LRU) caches prioritize keeping data that has been accessed most recently, and Least Frequently Used (LFU) caches prioritize keeping data that is accessed most often. These strategies work when the items in the cache use a similar amount of work to replace the data. In those cases, optimizing for a higher cache hit ratio may reduce an amount of work performed by a system. However, optimizing for a higher cache hit ratio may not reduce an amount of work performed by a system when computational costs associated with generating data is heterogeneous across cache entries. The technologies described herein may decrease an amount of work performed by a system in heterogeneous work cases by computing a cost associated with generating cache entries and evicting a cache entry based on the cost to re-compute the cache entry in the event of a cache miss of the cache entry.

To further describe the present technologies, examples are now provided with reference to the figures. FIG. 1A is a block diagram that illustrates a high level example of a system for managing cache entries 118 using cost measures 114 that represent a cost associated with generating the individual cache entries 118. As shown, the system may include a service provider environment 100 that includes computing resources for hosting components of the system. An example of a service provider environment is described later in more detail in association with FIG. 9.

FIG. 1A illustrates one example system environment for managing cache entries 118 using cost measures 114. The example system environment includes a web server 106 in network communication with a plurality of clients 108, where in response to a request from a client 108, the web server 106 obtains computed data 112 (e.g., a calculation, a data object, a webpage component, a recommendation, etc.) from an application 110 and provides the computed data 112 to the client 108 (e.g., as part of a webpage or returned as part of a web application request). As described in detail below, the application 110 may be configured to cache computed data 112 in order to avoid having to re-compute or regenerate the computed data 112 each time a request for the computed data 112 is received.

The system may include a caching service 116 (or cost based caching service) configured to cache computed data 112 generated by the application 110 in a cache entry 118. As will be appreciated, a plurality of applications 110 may use the caching service 116 to cache computed data 112 in cache entries 118. In some examples, the functionality described in relation to the application 110 below may be performed by a program, process, function, service, or other computing entity. For example, a program code function, which may be a "serverless" function or computer code that is invoked in response to a work request, may be configured to perform the operations described below in association with the application 110.

The caching service 116 may be hosted on one or more servers 104 located in the service provider environment 100. In one example, the caching service 116 may be a managed service provided by a service provider for customers to allow customer applications 110 to use the caching service 116 and temporarily store computed data 112 in a cache 128 provided by the caching service 116. The caching service 116 may manage cache entries 118 using a cost measure 114 associated with the individual cache entries 118. A cache entry 118 may include computed data 112 generated by an application 110 and a cost measure 114 that represents a cost associated with generating the computed data 112. A cost of generating computed data 112 may be based on one or more cost types associated with generating the computed data 112. A cost type may be a type of computing resource consumption or type of computing or consumption cost incurred to generate computed data 112. Example cost types may include, but are not limited to: CPU consumption, amount of I/O, bandwidth consumption, GPU consumption, networking resource consumption, consumption of resources from additional services, API (Application Programming Interface) calls to additional services, calls to other resources in the service provider environment 100, requests to metered and billed computing resources, amount charged to perform an operation, time spent by a user to provide user input, as well as other types of costs. A cost measure 114 may represent a cost as a numeric range (e.g., 1-10), a label (e.g., low, mid, high), a monetary amount, or any other representation that indicates a cost to generate computed data 112.

In one example, an application 110 hosted on a server 102 may calculate a cost measure 114 associated with generating computed data 112, and the application 110 may include the cost measure 114 with computed data 112 when sending the computed data 112 to the caching service 116. For example, the application 110 may generate computed data 112 (e.g., in response to a request from a web server 106) along with a cost measure 114 for the computed data 112. The application 110 may calculate the cost measure 114 using the cost types described above. For example, the application 110 may base a cost measure 114 on a number of I/O operations performed and/or an amount of CPU consumed. Cost measures 114 generated by applications 110 may represent homogeneous or heterogeneous work performed to generate computed data 112. For example, work performed by various applications 110 may be varied, where some applications 110 may be configured to perform simple data computations and other applications may be configured to perform more complex data computations.

Figure 2:
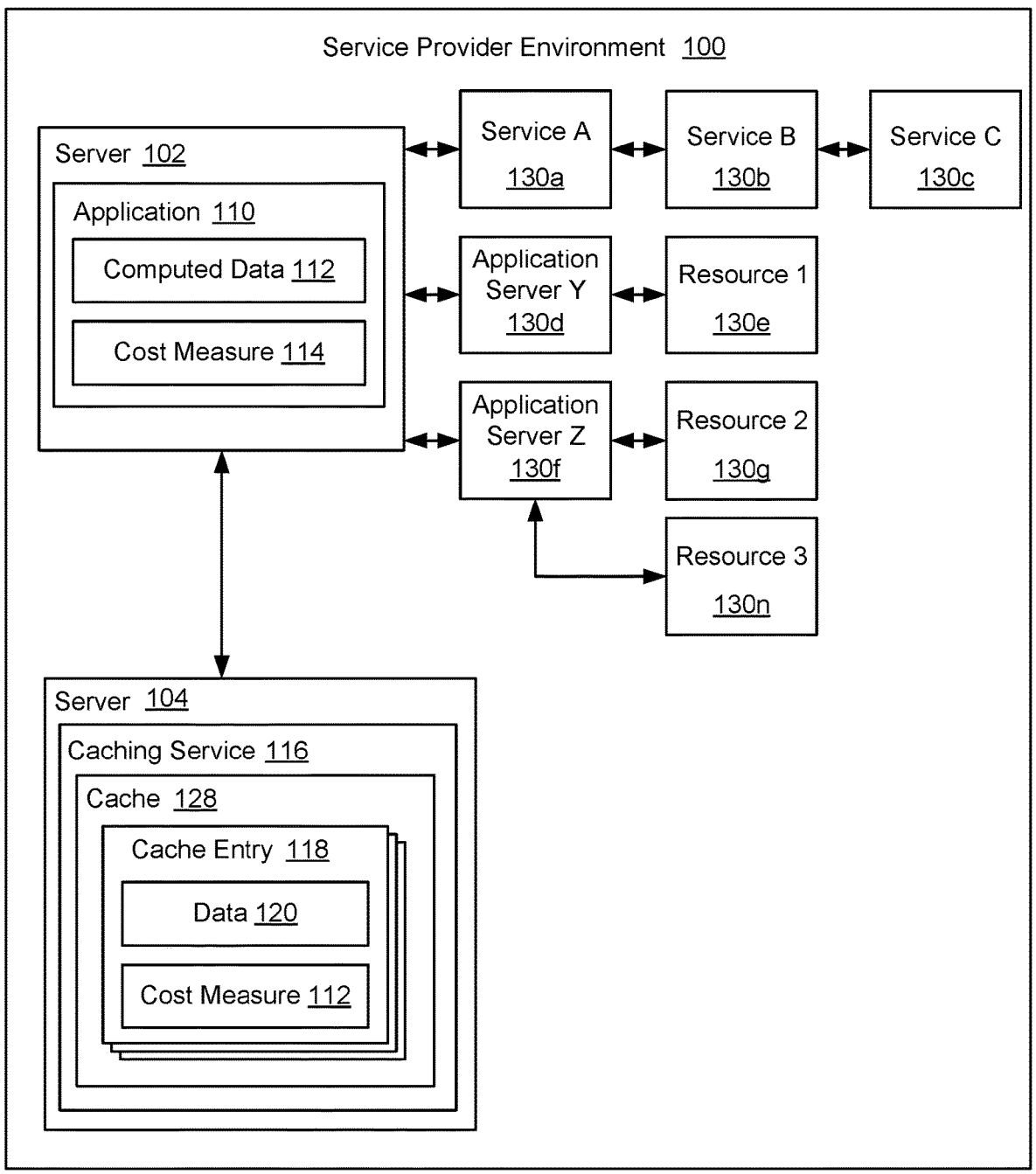
FIG. 2 is a block diagram that illustrates an example system including an application configured to access multiple computing resources to generate computed data and a cost measure associated with generating the computed data.

As illustrated in FIG. 2, an application 110 may interface with multiple computing resources 130a-n to generate computed data 112. The computing resources 130a-n may be hosted on one or more servers (including a server 102 hosting an application 110) located in a service provider environment 100. The computing resources 130a-n may include services, application servers, data stores, and other resources. Each computing resource 130a-n, which an application 110 directly or indirectly interfaces with as part of generating computed data 112, may be reflected in a cost measure 114 for the computed data 112. As an illustration, an application 110 may perform an operation to generate computed data 112 that results in many operations being performed, such as requesting that a first service 130a perform a task, which in turn causes a chain of tasks to be performed by a second service 130b and third service 130c. Each operation or task performed by the application 110 and services 130a-c to generate the computed data 112 may be considered when calculating a cost measure 114 for the computed data 112. As a non-limiting example, each operation and/or task can be assigned a value (e.g., based on how long the operation takes or based on an amount of computer power an operation consumes), and the values may be summed to produce the cost measure 114 for the computed data 112. As another illustration, an application 110 may perform multiple operations to generate computed data 112, where an individual operation may result in additional operations being performed, such as sending a request to an application server 130d/f that in turn retrieves a resource 130e/g/n. Again, each operation performed by the application 110 and the application server 130d/f may be considered when calculating a cost measure 114, such as assigning a value to each operation in proportion to an amount of work performed and summing the values to produce the cost measure 114.

Also, in one example, intermediate work for caching may be performed to cache intermediate data (not shown) and the intermediate data may be included in top level computed data 112. As a non-limiting example, computed data 112, such as a webpage component, may be a collection of intermediate data (e.g., targeted product recommendations), and cache entries 118 may be created for the intermediate data in cache 128. As an illustration, a first product recommendation may be obtained from an application server 130d and stored to the cache 128, and a second product recommendation may be obtained from an application server 130f and stored to the cache 128. When a request for the product recommendations are received (e.g., from a web server), the first and second product recommendations may be obtained from the cache entries 118 stored in cache 128, and the application may provide the product recommendations to the requester (e.g., the web server). In one example, intermediate data may be cached in different caches (e.g., local cache, remote cache, level 1 cache, level 2 cache, etc.) based on cost measures 114 of the intermediate data.

Returning again to FIG. 1A, after generating computed data 112 and a cost measure 114, the application 110 may send the computed data 112 and cost measure 114 to the caching service 116 in order to temporarily preserve the computed data 112, potentially making the computed data 112 more quickly and easily available to the application 110 should the computed data 112 be needed sometime in the near future. As an illustration, the application 110 may be configured to generate computed data 112 in response to receiving a request (e.g., from a web server 106 or another entity), and the application 110 may provide the computed data 112 to the requesting entity. In addition, the application 110 may generate a cost measure 114 for the computed data 112 as described previously, and the application 110 may send the computed data 112 and the cost measure 114 to the caching service 116 to be temporarily stored in cache 128. In the event that the application 110 receives another request for the computed data 112 (e.g., from the web server 106 or from another entity), the application 110 sends a request for the computed data 112 to the caching service 116. In the case that a cache entry 118 for the computed data 112 has not been evicted from the cache 128, the caching service 116 may return the computed data 112 to the application 110, allowing the application 110 to provide the computed data 112 to the requesting entity (e.g., the web server 106). However, if the cache entry 118 has been evicted from the cache 128, the application regenerates the computed data 112 along with a cost measure 114 for the computed data 112, and the application 110 provides the computed data 112 to the requesting entity, and sends the computed data 112 and the cost measure 114 to the caching service 116 to temporarily store a cache entry 118 containing the computed data 112 in the cache 128.

As part of receiving an incoming cache entry 118, the caching service 116 may prioritize or rank the incoming cache entry 118 according to a cost measure 114 included in the cache entry 118. For example, the cache entry 118 may be prioritized for eviction from cache 128 based on the cost measure 114 of the cache entry 118. A cache entry 118 that is highly prioritized for eviction may be evicted from the cache 128 before evicting other cache entries 118 from the cache 128. In one example, a cache 128 may be implemented as a priority queue which can be used to manage evictions of prioritized cache entries 118. After assigning a priority to a cache entry 118 based on a cost measure 114, the caching service 116 may add the cache entry 118 to the cache 128 (e.g., priority queue). In the event that a cache entry 118 needs to be evicted from the cache 128, the caching service 116 may select a cache entry from the cache 128 that is prioritized for eviction and evict the cache entry from the cache 128. Accordingly, the cache entry that has the lowest cost to re-compute the cache entry 118 (i.e., re-compute the data 112), as compared to cost measures for other cache entries, may be evicted from cache 128. Evicting the cache entry prioritized for eviction from cache 128 preserves higher cost cache entries in the cache 128 in order to reduce an amount of work (e.g., computing resource consumption) that would have otherwise been performed by the system had a higher cost cache entry been evicted from the cache 128 and had the higher cost cache entry been re-computed due to a cache miss of the higher cost cache entry.

Figure 1B:
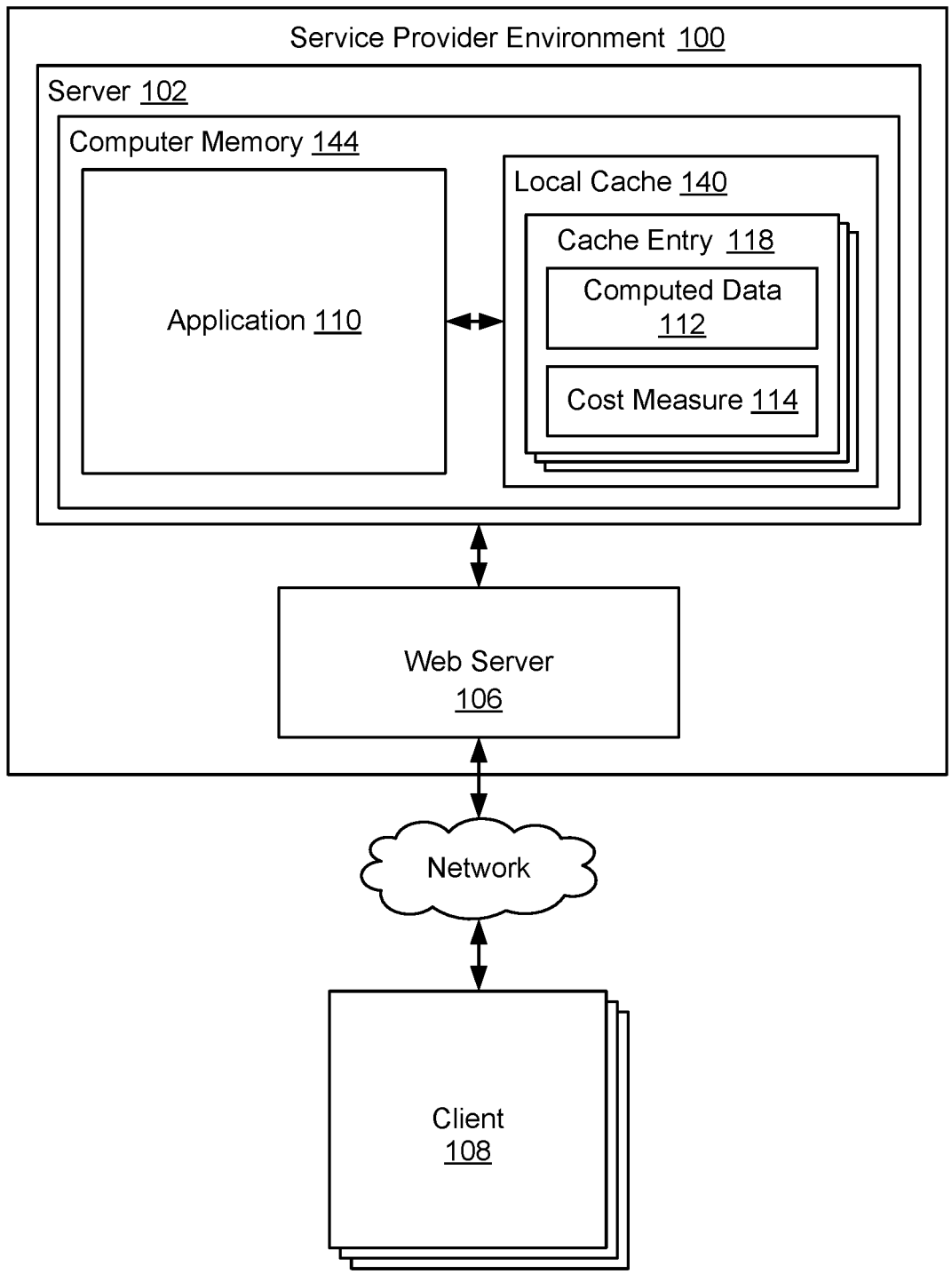
FIG. 1B is a block diagram that illustrates another example of a system where cache entries generated by an application are stored in a local cache and the cache entries are managed using cost measures that represent a cost associated with generating the cache entries.

FIG. 1B illustrates another example of a system environment where cache entries 118 generated by an application 110 are stored in a local cache 140 and the cache entries 118 are managed using cost measures 114 that represent a cost associated with generating the cache entries 118. In one example, a local cache 140 may include logic for managing cache entries 118 generated by the application 110 and stored to the local cache 140 in computer memory 144 of a server 102. In another example, the application 110 may include logic (e.g., a caching module) for managing cache entries 118 generated by the application 110 and storing the cache entries 118 to the local cache 140 in computer memory 144 of the server 102. The logic may perform the functionality described above in association with the caching service 116 in FIG. 1A.

The logic for managing cache entries 118, in one example, may create a cache entry 118 for computed data 112 generated by the application 110 (e.g., in response to a request for the computed data 112). As part of creating the cache entry 118, the logic may calculate a cost measure 114 for the computed data 112, and the logic may prioritize the cache entry 118 for eviction from the local cache 140 based on the cost measure 114. For example, a priority queue may be used to prioritize cache entries 118 and the logic may insert the cache entry 118 in the priority queue according to the priority assigned to the cache entry 118. In the case that the cache is full, one or more cache entries prioritized for eviction may be evicted to make room for the incoming cache entry. In the event that the application 110 receives another request for the computed data 112 and the cache entry 118 has not been evicted, the logic may retrieve the computed data 112 from the cache entry 118, and the application 110 may return the computed data 112 in response to the request. In the case that the cache entry 118 has been evicted, the application 110 may regenerate the computed data 112, and the logic may create a new cache entry for the computed data 112 and prioritize the new cache entry based on a cost measure 114 for the computed data 112.

In the examples described above, an application 110 calculates a cost measure 114 associated with generating computed data 112. In another example, the caching service 116 (shown in FIG. 1A) or logic included in the local cache 140 (shown in FIG. 1B) may be configured to estimate a cost measure 114 for computed data 112. As one example, the caching service 116 or logic for the local cache 140 may base a cost measure 114 on an amount of time between a cache miss and receiving a cache entry 118 related to the cache miss. For example, in the event that a request is received from an application 110 for a cache entry 118, and the cache entry 118 has been evicted from cache, the caching service 116 or local cache 140 may track an amount of time that occurs between the request for the cache entry 118 and receiving a new cache entry from the application 110 that replaces the cache entry 118 evicted from the cache 128. As another example, the caching service 116 or local cache 140 may estimate a cost measure 114 for computed data 112 based on collected metrics (not shown) related to costs expended to generate the computed data 112. For example, metrics associated with cost factors (e.g., CPU consumption, I/O amount, bandwidth consumption, etc.) for generating the computed data 112 may be collected (e.g., by the caching service 116, local cache 140, or another service) from the application 110 and/or other sources, and a cost measure 114 may be calculated for the computed data 112 using the metrics.

Figure 3:
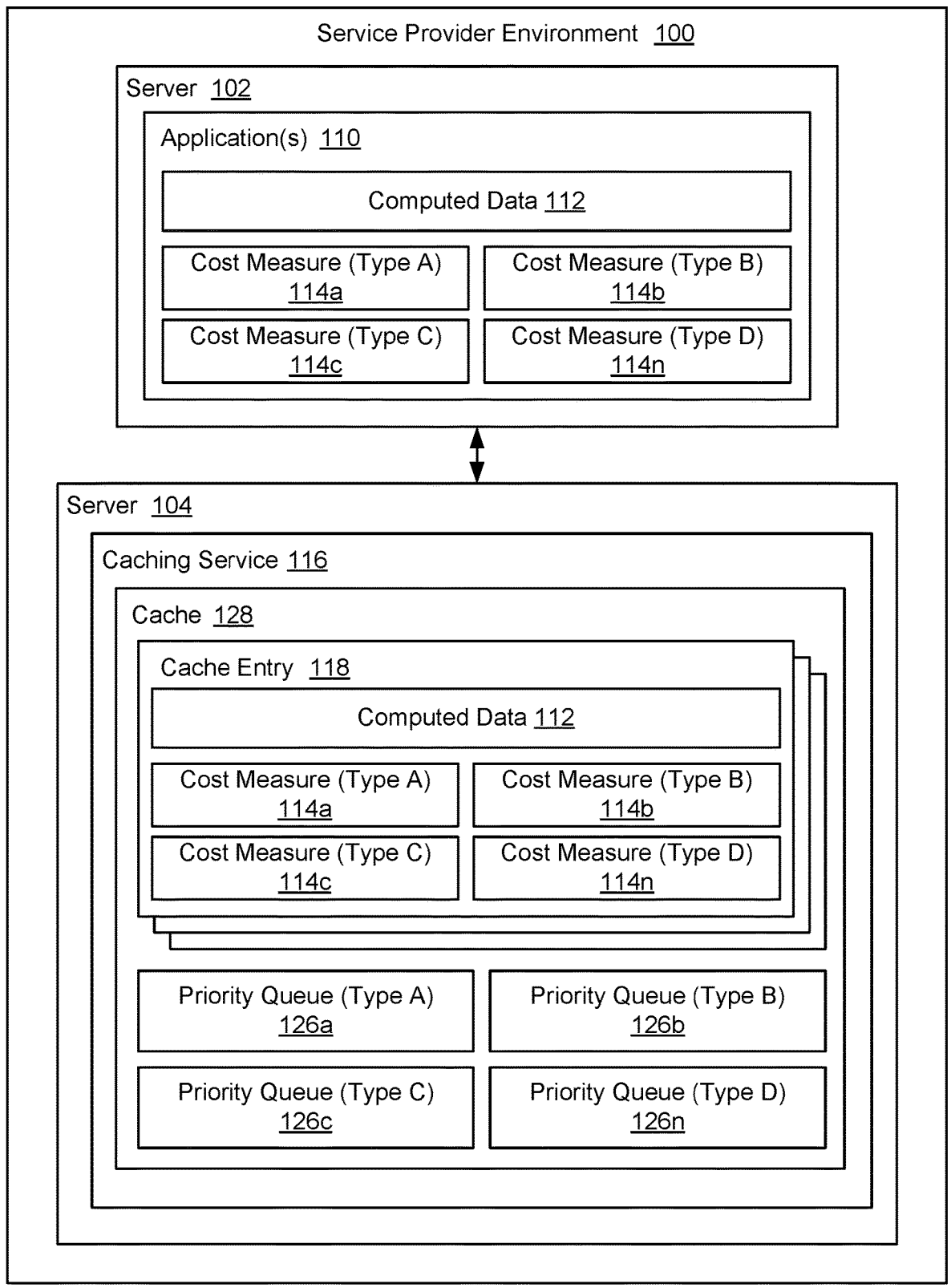
FIG. 3 is a block diagram illustrating an example system for managing cache entries stored in a cache using a plurality of cost measures representing different types of computing costs expended to generate individual cache entries.

FIG. 3 illustrates an example system for managing cache entries 118 stored in a cache 128 with a plurality of cost measures 122a-n that represent different types of computing costs expended to generate individual cache entries 118. A computing cost type may be a type of computing resource cost (e.g., CPU consumption, I/O operation, bandwidth consumption, etc.) and/or a type of consumption cost (e.g., metered and billed computing resource, fixed cost operation, billed user input, etc.) incurred to generate computed data 112. A plurality of cost measures 112a-n may be calculated for computed data 112, where each cost measure 114a-n represents a different type of computing cost expended to generate the computed data 112.

An application 110 may calculate a cost measure 114a-n for each of a number of computing cost types associated with generating computed data 112 and send the cost measures 112a-n with the computed data 112 to the caching service 116. The caching service 116 may store a cache entry 118 that contains the computed data 112 and the cost measures 114a-n received from the application 110 in cache 128. As an illustration, the application 110 may calculate a first cost measure 114a based on an amount of CPU consumption used to generate computed data 112, a second cost measure 114b based on a number of I/O operations performed in association with generating the computed data 112, a third cost measure type 112c based on an amount of bandwidth consumed in association with generating the computed data 112, and a fourth cost measure 114n based on a consumption cost of an amount charged to access a metered resource in association with generating the computed data 112. The application 110 may send the computed data 112 and the cost measures 112a-n to the caching service 116, which stores a cache entry 118 containing the computed data 112 and cost measures 112a-n in cache 128.

In one example, the caching service 116 may prioritize a cache entry 118 based on a weighted cost associated with generating computed data 112. The caching service 116 may compute the weighted cost from multiple cost measures 112a-n that represent different types of computing costs expended to generate the cache entry 118. As an example, for each cost measure 114a-n, the caching service 116 may apply a weight to the cost measure 114a-n, and the caching service 116 may compute a weighted cost for the cache entry 118. For example, a weight associated with a computing cost type can be applied to a cost measure 114a-n that represents the computing cost type. As an illustration, a CPU weight may be applied to a CPU cost measure, an I/O weight may be applied to an I/O cost measure, and so on. After computing a weighted cost for a cache entry 118, the caching service 116 may prioritize the cache entry 118 for eviction based on the weighted cost.

In another example, the caching service 116 may perform dynamic ranking of cache entries 118 based on a currently constrained computing resource. In this example, the caching service 116 may maintain a plurality of priority queues 126a-n associated with individual computing cost types. For example, each priority queue 126a-n may be associated with a different computing cost type (e.g., CPU, I/O, bandwidth, etc.). In one example, the priority queues 126a-n may be implemented using priority queue pointers that reference cache entries 118 stored in cache 128. The pointers can be prioritized based on the cost measures 112a-n of the cache entries 118 to which the pointers reference.

A cache entry 118 may include cost measures 112a-n that correspond to the computing cost types associated with the plurality of priority queues 126a-n, and the caching service 116 may prioritize the cache entry 118 for eviction in each of the priority queues 126a-n according to the cost measures 112a-n that correspond to the priority queues 126a-n. For example, the caching service 116 may prioritize the cache entry 118 for eviction in a CPU priority queue based on a CPU cost measure, prioritize the cache entry 118 for eviction in an I/O priority queue based on an I/O cost measure, and so on for each cost measure 114a-n included in the cache entry 118.

When selecting a cache entry 118 to evict from cache 128, the caching service 116 may dynamically select the cache entry 118 by identifying a currently constrained computing resource and selecting a cache entry 118 from a priority queue 126a-n that has the lowest impact on the constrained computing resource to evict from cache 128. As an illustration, the caching service 116 may obtain the states of computing resources included in the service provider environment 100 from a computing resource monitor or metric monitoring service (not shown) and identify a currently constrained computing resource (e.g., CPU) for a customer's account (or for the overall service provider environment). The caching service 116 may identify a computing resource (e.g., network bandwidth) that may have a lower impact on the constrained resource (e.g., CPU) as compared to other computing resources should the computing resource (e.g., network bandwidth) be needed to re-compute data contained in an evicted cache entry. For example, the caching service 116 may select a cache entry 118 from a priority queue 126a-n associated with the lower cost computing resource (e.g., network bandwidth) based on the assumption that if the cache entry 118 needs to be recomputed, using the lower cost computing resource (e.g., network bandwidth) to re-compute the evicted cache entry may have a lower impact on the constrained resource (e.g., CPU) as compared to re-computing the evicted cache entry using a different computing resource.

Illustratively, the technique described above may protect a cache entry 118 associated with a currently constrained resource and application 110 (e.g., due to a large volume of requests for computed data 112) from being evicted from cache 128 and potentially decreasing the constraint on the application 110 by allowing the application 110 to obtain the cache entry 118 from cache 128 instead of having to re-compute the cache entry 118. For example, the constrained application 110 may be consuming a large amount of CPU to respond to requests for the computed data 112. Therefore, the caching service 116 may base an eviction decision on the constrained CPU being consumed by the application 110 and select a cache entry 118 from a priority queue 126a-n that may have less of a negative impact on the constrained resource and application 110.

Figure 4:
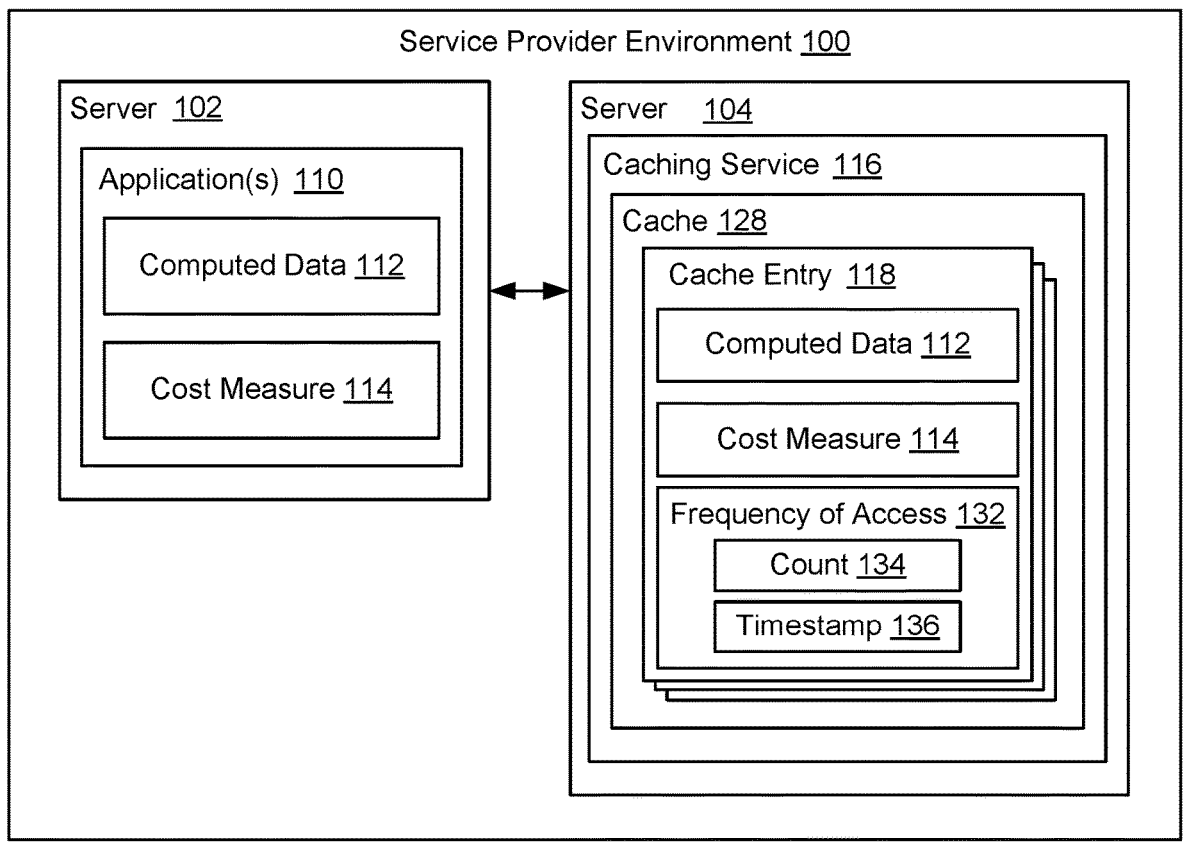
FIG. 4 is a block diagram illustrating an example of a system for managing cache entries using cost measures for individual cache entries and a frequency of access of the individual cache entries.

FIG. 4 illustrates an example system for managing cache entries 118 using cost measures 114 for individual cache entries 118 and a frequency of access 132 of the individual cache entries 118. In some cases, evicting a lowest cost cache entry may not result in a reduction of computing resource cost. For example, consider the case where multiple lower cost cache entries are accessed frequently and some higher cost entries are accessed relatively rarely. The higher cost entries may not be evicted from the cache 128 and may occupy space in cache 128 effectively making the cache 128 smaller. As such, the lower cost cache entries may be evicted from the cache 128 more often due to the smaller size of the cache 128. This scenario may increase a total amount of work performed to generate computed data 112.

In order to reduce a total amount of work performed due to cache misses described in the scenario above, a frequency of access 132 and a cost measure 114 may be used to determine when to evict a cache entry 118 from the cache 128. The frequency of access 132 may be an estimate of future access frequency for a cache entry 118, where the estimate of future access frequency may be based on a record of past access frequency (count 134) or an inverse of time since last access of the cache entry 118. For example, a long period since the last access will increase the chance of the cache entry 118 being evicted. The inverse of time since last access may be determined using a timestamp 136. In one example, the frequency of the access count 134 and/or the timestamp 136 may be stored as historical frequency statistics for evicted cache entries 118. The caching service 116 may reference the historical frequency statistics to estimate a future access frequency for an existing cache entry.

The caching service 116 may determine a total cost for a cache entry 118 based on a cost measure 114 and an estimate of frequency of access 132 for the cache entry 118. The total cost may be a product of the cost measure 114 and the estimate of future frequency of access 132. In one example, the caching service 116 may compute a total cost for a cache entry 118 by first determining an estimate of frequency of access 132 for the cache entry 118, and then the total cost may be generated as a product of the frequency of access 132 and the cost measure 114 for the cache entry 118. The caching service 116 may add the cache entry 118 to the cache 128 implemented using a priority queue to prioritize cache entries 118 for eviction from the cache 128. As will be appreciated, a total cost for a cache entry 118 may be computed using other types of calculations, including summing, aggregating, or averaging functions, which accept cost measure 114 and estimate of future frequency of access 132 input, and which output a total cost. In one example, the cache entry 118 may be ranked based on the total cost of the cache entry 118 and inserted into the cache 128 according to the rank.

Figure 5A:
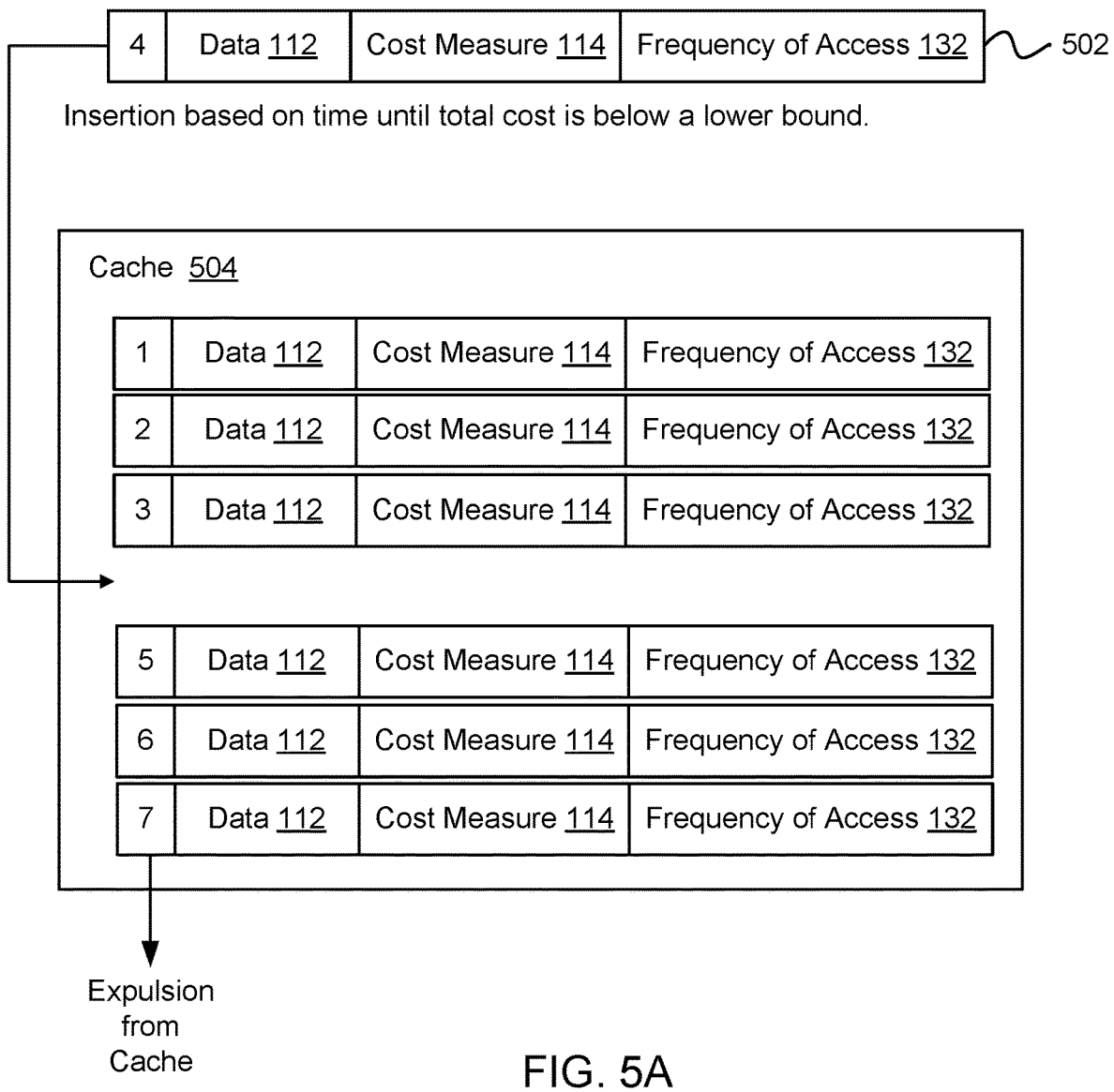
FIG. 5A is a diagram that illustrates an example of ranking a cache entry for insertion into cache using a total cost computed using a cost measure and frequency of access.

In another example, an eviction time representing a time to evict a cache entry 118 may be calculated, and the eviction time may be used to rank the cache entry 118 in cache 128 (e.g., implemented using a priority queue), as shown in FIG. 5A. The eviction time may be a time in which a total cost of a cache entry 502 is estimated to go below a threshold or lower bound that represents the eviction time. As described above, the total cost may be a product (or other calculation) of a cost measure 114 and an estimate of future frequency of access 132 of the cache entry 502. In one example, the caching service 116 may compute an eviction time by determining a time in which a total cost for a cache entry 502 is estimated to go below the threshold or lower bound. Any relatively low threshold or lower bound for the cache may be used and the computation of the total cost may still evict cache entries 502 with low access. After determining the eviction time, the cache entry 502 may be ranked based on the eviction time, and the cache entry 502 may be inserted into cache 128 according to the rank. The rank of the cache entry 502 in the cache 128 may be absolute, and therefore, the rank determines when the cache entry 502 is evicted from cache 128. In one example, if the cache entry 502 is accessed (e.g., by an application 110), the rank of the cache entry 502 may be recomputed as described above, and the cache entry 502 may be reinserted into the cache 128 according to the new rank.

As illustrated in FIG. 5B, in some examples, the techniques for managing cache entries using cost measures described above can be combined with a time to live (TTL) to ensure that high cost cache entries are periodically evicted from the cache. For example, a TTL may be used in combination with the above techniques to allow a high cost frequently accessed cache entry to be preserved in cache until the TTL expires, at which time the cache entry may be removed from the cache stored in computer memory.

In one example, a TTL may be implemented to manage cache entries using a TTL priority queue 508 that sorts the cache entries by TTL and a total cost priority queue 506 that sorts the cache entries by total cost, which, for example, may be a product of a cost measure 114 and a frequency of access 132. Identifying a cache entry to evict from cache may include referencing a TTL 510 for a cache entry at the head of the TTL priority queue 508 to determine whether the TTL 510 has expired. In the case that the TTL 510 has expired, the cache entry may be removed from cache. In the case that the TTL 510 has not expired, a cache entry prioritized for eviction in the total cost priority queue 506 may be removed from cache.

In another example, a TTL may be used to rank cache entry. For example, a total cost for a cache entry may be computed as a product of a cost measure 114, an estimate of frequency of access 132, and a TTL for the cache entry. The total cost may be an estimate of cost saving per unit time that may be realized by caching the data 112 in cache 504. A potential advantage of including a TTL in the total cost calculation may be that cache entries with longer TTLs may be given more priority for retaining the cache entry in cache.

Figure 6:
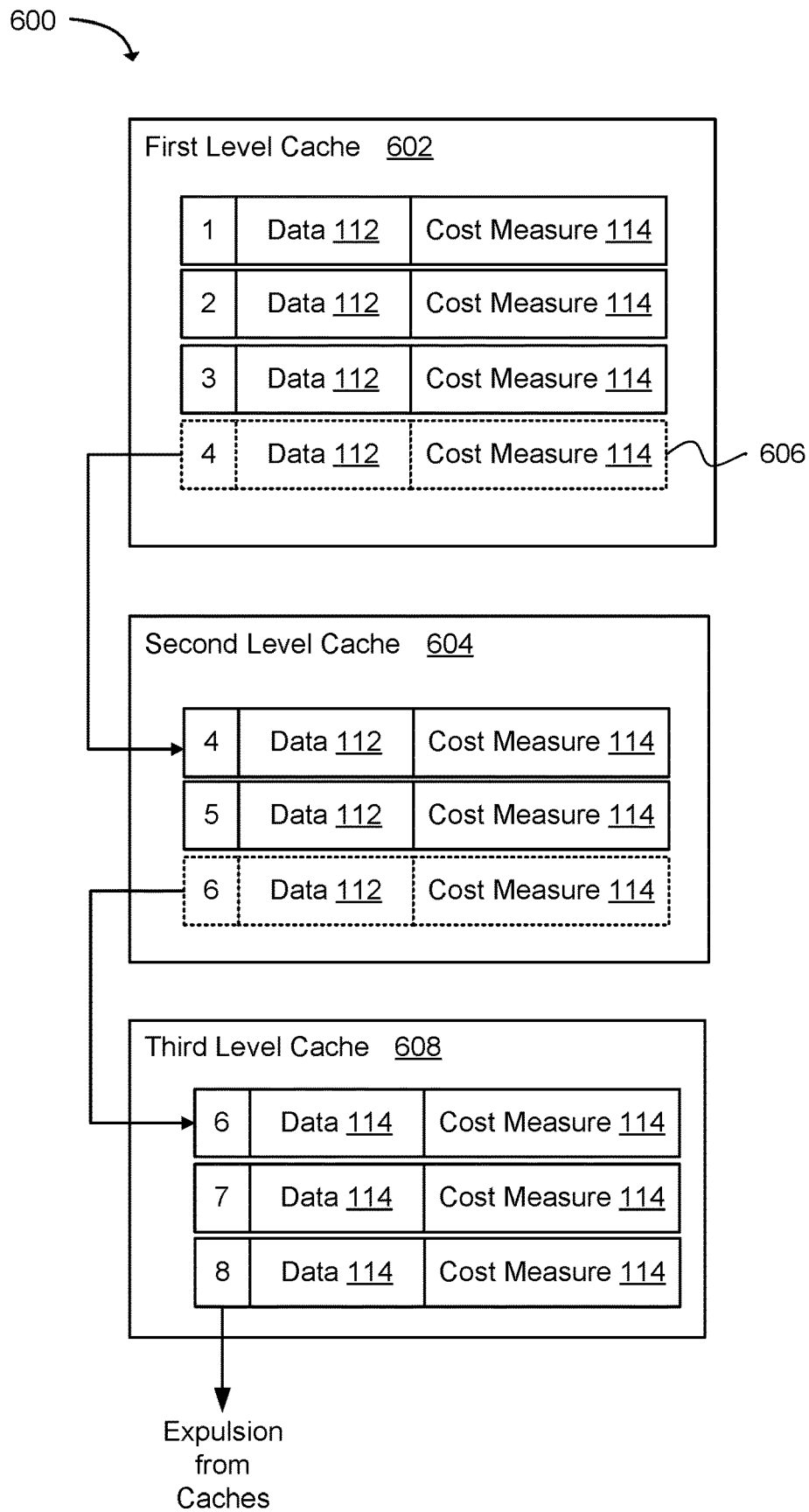
FIG. 6 is a block diagram illustrating an example of a multi-tiered cache that has cache levels associated with frequency of access to cache entries.

Moving now to FIG. 6, a block diagram illustrates an example of a multi-tiered cache 600 that may be used in association with the present technologies. In one example, the multi-tiered cache 600 may be a collection of cost-based caches, where each cost-based cache may be associated with a band of access frequency or access recency. For example, cache entries may each start in the first level cache 602. The goal is to maintain high cost cache entries that are frequently or recently accessed in the first level cache 602 that acts as a most frequently accessed cache, and less frequently accessed cache entries may be moved to lower level caches (e.g., second level cache 604 and third level cache 608). Full eviction of a cache entry occurs when the cache entry reaches a lowest frequency band cache (e.g., third level cache 608). As a more specific illustration, a cache entry 606 evicted from a first level cache 602 (e.g., the most frequently accessed cache) may be inserted into a second level cache 604. In the case that frequency of access of the cache entry 606 is less than a frequency of access of other cache entries, the cache entry 606 may be evicted from each level of cache until finally the cache entry 606 is fully evicted from the multi-tiered cache 600.

In another example, a multi-tiered cache 600 may comprise a first level cache 602 located on a local server and a second level cache 604 located on a remote server. As an illustration, the first level cache 602 may be a local cache 140 on a server that hosts an application 110 as illustrated in FIG. 1B, and a second level cache 602 may be provided by a caching service 116 as illustrated in FIG. 1A. The first level cache 602 may provide quicker access to cache entries as compared to the cache entries in the second level cache 604. In one example, the second level cache 602 may be a shared cache, and applications that generate the same computed data can cache the computed data on the shared second level cache 602, making the computed data available to the applications. In one configuration, the second level cache 604 may be a distributed cache that is distributed among many servers which update the caches using a cache gossip protocol.

An application may generate computed data and store the computed data in a cache entry of the first level cache 602 and a copy of a cache entry on the second level cache 604. As described earlier, the cache entries stored to the first and second level caches 602/604 may be prioritized for eviction based on a cost measure 114 for the cache entries. Another application configured to generate the computed data may, in response to a request for the computed data, query a first level cache 602 that is local to the application to determine whether the first level cache 602 contains a cache entry for the computed data, and if the first level cache 602 does not contain the computed data, the application may query the second level cache 604 for a cache entry for the computed data.

In one example, a cache entry on the first level cache 602 may be prioritized to be evicted from the first level cache 602 before a matching cache entry on the second level cache 602 is evicted. As an example, a TTL for the cache entry on the first level cache 602 may be smaller or shorter than a TTL for a matching cache entry on the second level cache 604. In another example, a cache entry can be prioritized for eviction from the first level cache 602 based on a hit probability that the cache entry will be in the second level cache 604 should a cache miss occur in the first level cache 602. For example, the hit probability may be estimated by multiplying a probability that the cache entry will be in the second level cache 604 by a cost of obtaining the cost measure from the second level cache 604.

The various processes and/or other functionality contained within the systems described above may be executed on one or more processors that are in communication with one or more memory modules. The systems may include a number of computing devices that are arranged, for example, in one or more server banks or computer banks or other arrangements. The computing devices may support a computing environment using hypervisors, virtual machine monitors (VMMs) and other virtualization software.

Data described in association with the systems may be stored in data stores. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the services included in the systems may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

One or more networks may allow components of a system, including servers, services, and other computing resources, to communicate with one another. A network can include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

The figures referenced above illustrate that certain computing services may be used to implement the present technologies, and these computing services may be implemented as processing modules. In one example configuration, a service may be considered a processing module with one or more processes executing on a server or other computer hardware. The services may be centrally hosted functionality or a service application that may receive requests and provide output to other services or consumer devices. For example, services may be considered on-demand computing that are hosted in a server, virtualized service environment, grid or cluster computing system. An API may be provided for each service to enable a second service to send requests to and receive output from the first service. Such APIs may also allow third parties to interface with a service and make requests and receive output from the service. While the figures referenced above illustrate examples of system environments that may implement the techniques above, many other similar or different environments are possible. The example system environments discussed and illustrated above are merely representative and not limiting.

Figure 7:
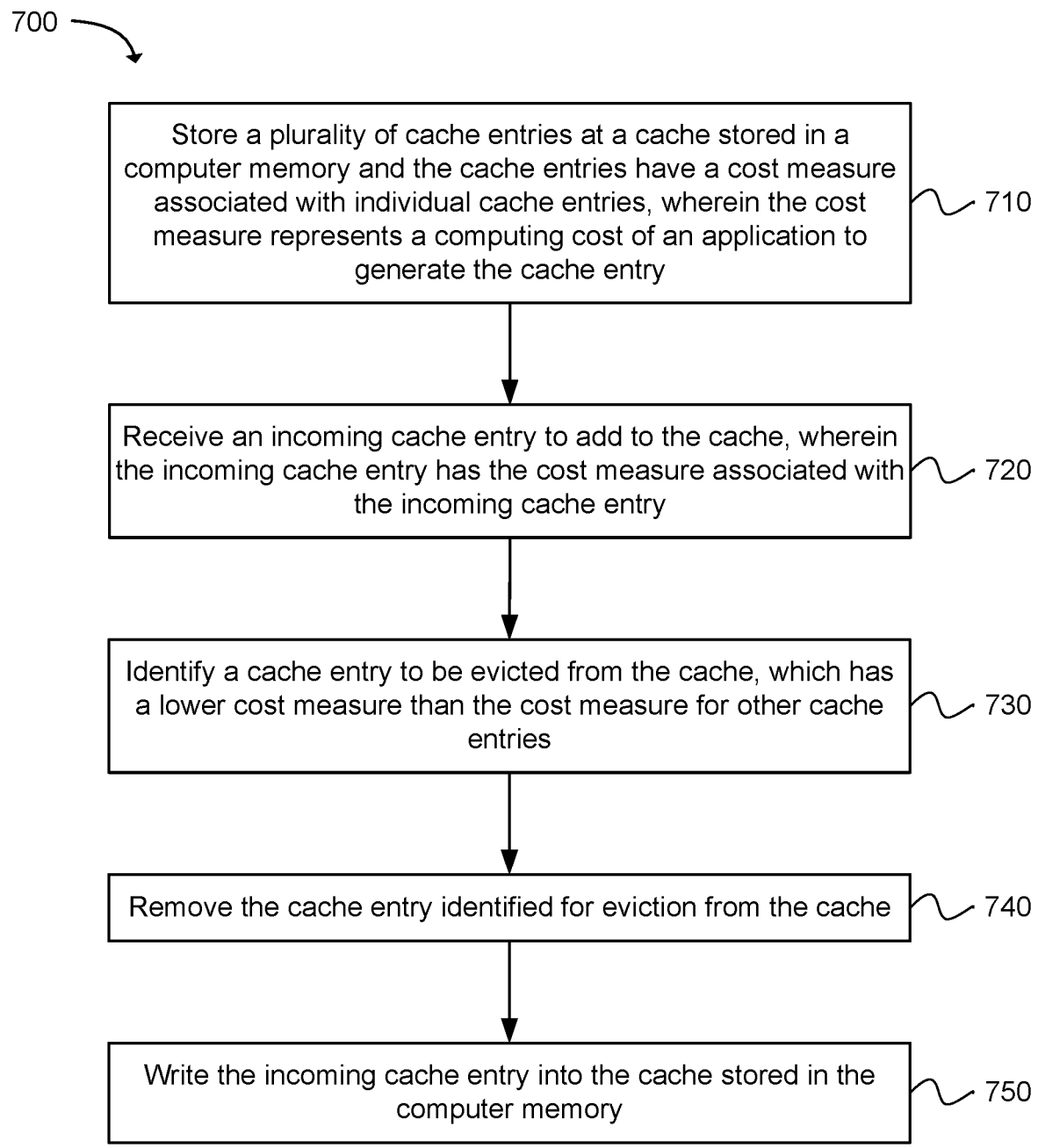
FIG. 7 is a flow diagram that illustrates an example method for cost based management of cache entries stored in a computer memory.

FIG. 7 is a flow diagram that illustrates an example method 700 for cost based management of cache entries stored in a computer memory. The method 700 may be executed using one or more of the systems described above. As in block 710, the method 700 may store a plurality of cache entries at a cache stored in a computer memory. A cache entry may have a cost measure that represents a computing cost of an application to generate the cache entry. The cost measure may represent an amount of computing resources used to generate data stored to a cache as a cache entry. In one example, the cost measure may be generated by an application. The cost measure may be based in part on at least one of: CPU (central processing unit) consumption, amount of I/O (input/output), bandwidth consumption, GPU (graphics processing unit) consumption, networking resources consumed, consumption of resources from additional services, API (Application Programming Interface)

calls to additional services, or calls to other resources in the service provider environment. In one example, the cost measure may be a weighted cost computed from a plurality of costs individually stored based on computing cost types.

As in block 720, the method 700 may receive an incoming cache entry to add to the cache. The incoming cache entry includes a cost measure associated with the incoming cache entry. In one example, the cache may be a priority queue that is prioritized based on the cost measure. For example, the cache entry may be inserted into the cache based on the cost measure, and the cost measure may prioritize the cache entry for eviction from the cache.

As in block 730, the method 700 may identify a cache entry to be evicted from the cache. The cache entry selected may have a lower cost measure than the cost measures for other cache entries. In one example, a cache entry may include a plurality of cost measures for a plurality of computing cost types for the cache entry and a priority queue may be generated for each of the computing cost types. In the event that a cache entry needs to be evicted, a computing cost type that may be currently constrained may be identified and a priority cache entry may be selected from a priority queue of the computing cost type that may be currently constrained, and the priority cache entry may be evicted from the cache.

In one example, identifying a cache entry to be evicted from the cache may include identifying an eviction cache entry that has a lower total cost as compared to total costs of other cache entries, where the total cost represents a cost measure combined with a frequency of access. For example, a total cost may be computed for each cache entry by computing the total cost as a product of a cost measure and a frequency of access and the total cost may be compared to the total cost for other cache entries. The frequency of access may be a record of past access frequency or an inverse of the time since last access. The total cost of the cache entry may be used to prioritize the cache entry for eviction from the cache. As such, cache entries that have a lowest total cost may be evicted before evicting cache entries with a higher total cost.

As in block 740, the cache entry identified for eviction may be removed from the cache, and as in block 750, the incoming cache entry may be written into the cache stored in the computer memory. Accordingly, the incoming cache entry may replace the cache entry evicted from the cache.

Figure 8:
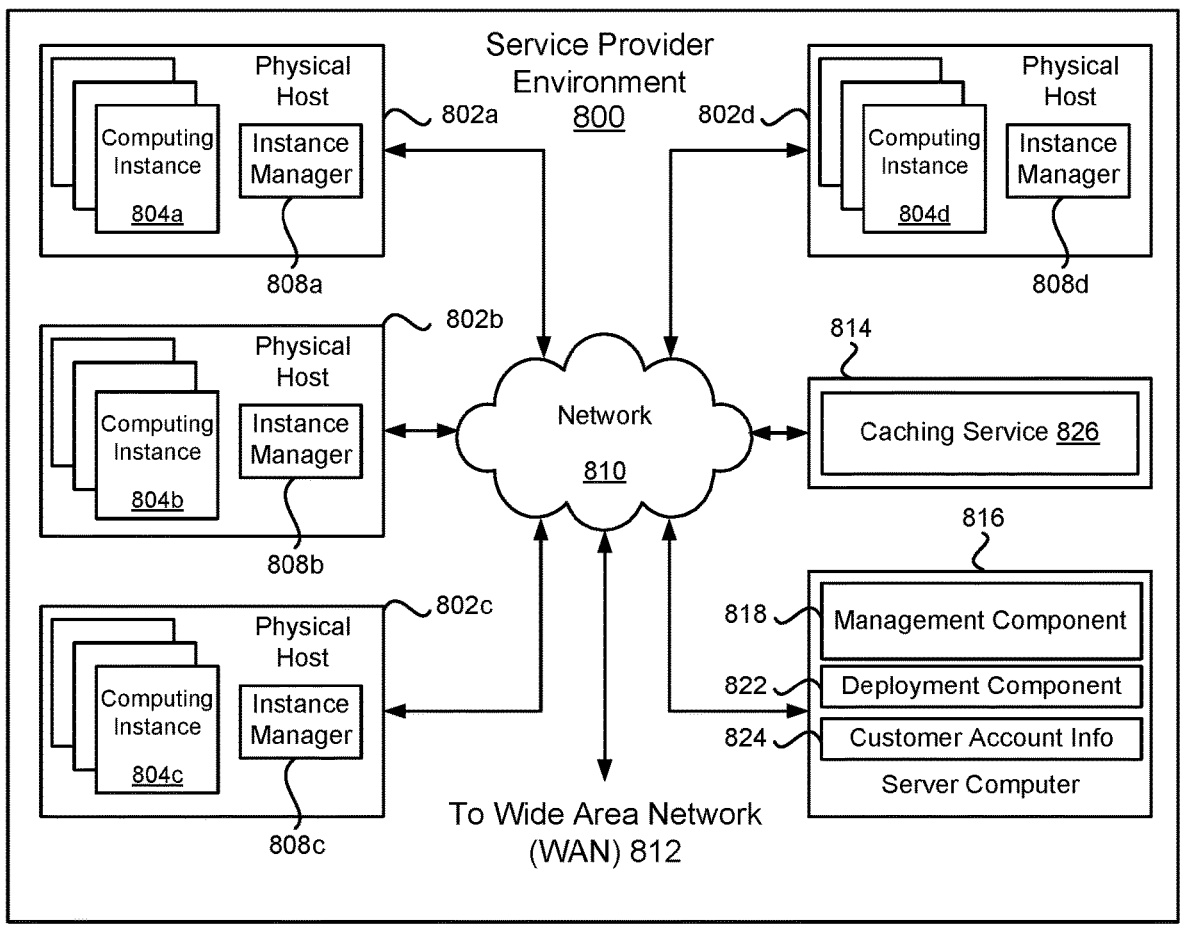
FIG. 8 is a block diagram illustrating an example service provider environment that includes resources for executing a caching service.

FIG. 8 is a block diagram illustrating an example computing service 800 that may be used to execute and manage a number of computing instances 804a-d upon which the present technology may execute. In particular, the computing service 800 depicted illustrates one environment in which the technology described herein may be used. The computing service 800 may be one type of environment that includes various virtualized service resources that may be used, for instance, to host computing instances 804a-d.

The computing service 800 may be capable of delivery of computing, storage and networking capacity as a software service to a community of end recipients. In one example, the computing service 800 may be established for an organization by or on behalf of the organization. That is, the computing service 800 may offer a "private cloud environment." In another example, the computing service 800 may support a multi-tenant environment, wherein a plurality of customers may operate independently (i.e., a public cloud environment). Generally speaking, the computing service 800 may provide the following models: Infrastructure as a Service ("IaaS") and/or Software as a Service ("SaaS"). Other models may be provided. For the IaaS model, the computing service 800 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 800. End customers may access the computing service 800 using networked client devices, such as desktop computers, laptops, tablets, smartphones, etc. running web browsers or other lightweight client applications, for example. Those familiar with the art will recognize that the computing service 800 may be described as a "cloud" environment.

The particularly illustrated computing service 800 may include a plurality of server computers 802a-d. The server computers 802a-d may also be known as physical hosts. While four server computers are shown, any number may be used, and large data centers may include thousands of server computers. The computing service 800 may provide computing resources for executing computing instances 804a-d. Computing instances 804a-d may, for example, be virtual machines. A virtual machine may be an instance of a software implementation of a machine (i.e. a computer) that executes applications like a physical machine. In the example of a virtual machine, each of the server computers 802a-d may be configured to execute an instance manager 808a-d capable of executing the instances. The instance manager 808a-d may be a hypervisor, virtual machine manager (VMM), or another type of program configured to enable the execution of multiple computing instances 804a-d on a single server. Additionally, each of the computing instances 804a-d may be configured to execute one or more applications.

A server 814 may execute a caching service 826 as described earlier. In some examples, the server 814 may host a computing instance used to execute the caching service 826. A server computer 816 may execute a management component 818. A customer may access the management component 818 to configure various aspects of the operation of the computing instances 804a-d purchased by a customer. For example, the customer may setup computing instances 804a-d and make changes to the configuration of the computing instances 804a-d.

A deployment component 822 may be used to assist customers in the deployment of computing instances 804a-d. The deployment component 822 may have access to account information associated with the computing instances 804a-d, such as the name of an owner of the account, credit card information, country of the owner, etc. The deployment component 822 may receive a configuration from a customer that includes data describing how computing instances 804a-d may be configured. For example, the configuration may include an operating system, provide one or more applications to be installed in computing instances 804a-d, provide scripts and/or other types of code to be executed for configuring computing instances 804a-d, provide cache logic specifying how an application cache is to be prepared, and other types of information. The deployment component 822 may utilize the customer-provided configuration and cache logic to configure, prime, and launch computing instances 804a-d. The configuration, cache logic, and other information may be specified by a customer accessing the management component 818 or by providing this information directly to the deployment component 822.

Customer account information 824 may include any desired information associated with a customer of the multi-tenant environment. For example, the customer account information may include a unique identifier for a customer, a customer address, billing information, licensing information, customization parameters for launching instances, scheduling information, etc. As described above, the customer account information 824 may also include security information used in encryption of asynchronous responses to API requests. By "asynchronous" it is meant that the API response may be made at any time after the initial request and with a different network connection.

A network 810 may be utilized to interconnect the computing service 800 and the server computers 802*a-d*, 816. The network 810 may be a local area network (LAN) and may be connected to a Wide Area Network (WAN) 812 or the Internet, so that end customers may access the computing service 800. In addition, the network 810 may include a virtual network overlaid on the physical network to provide communications between the servers 802*a-d*. The network topology illustrated in FIG. 8 has been simplified, as many more networks and networking devices may be utilized to interconnect the various computing systems disclosed herein.

Figure 9:
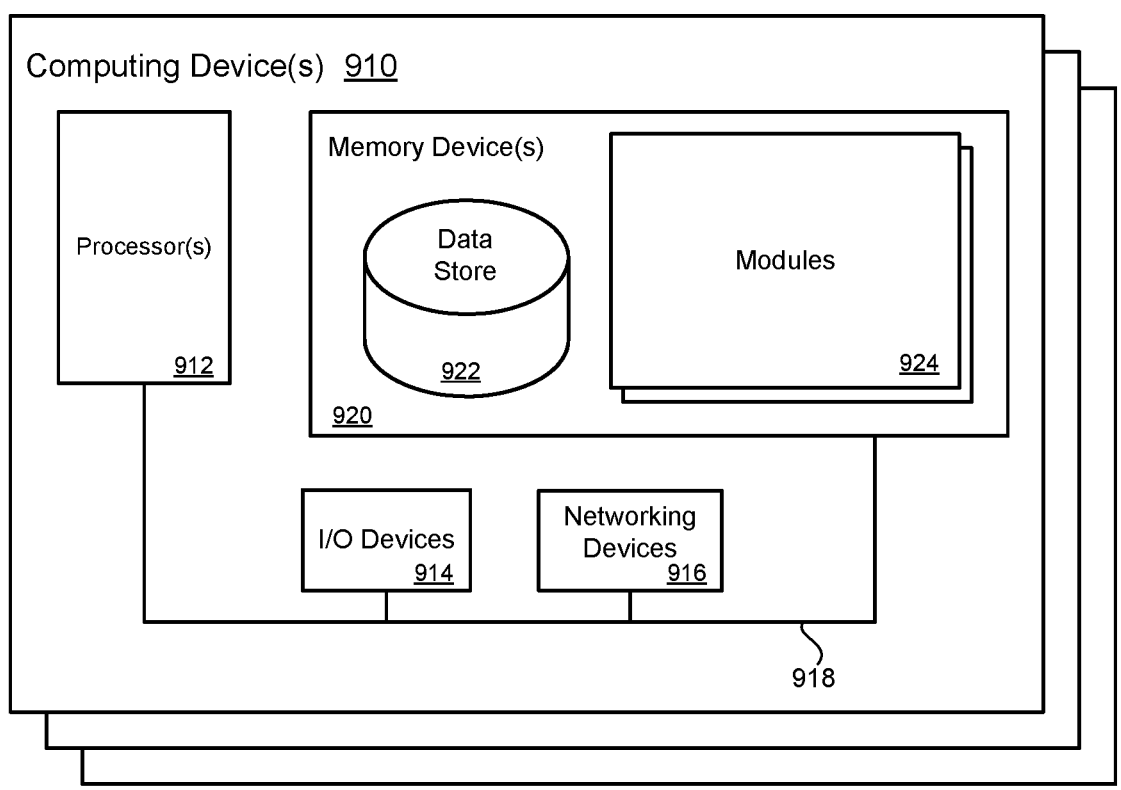
FIG. 9 is block diagram illustrating an example of a computing device that may be used to execute a method for cost based management of cache entries.

FIG. 9 illustrates a computing device 910 on which various functionalities of this technology may execute. The computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. In one example, the memory device 920 may include an application module, a computed data module, a cost measure module, a caching service module, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a local area network (LAN), wide area network (WAN), or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method, using one or more processors, comprising:
   storing a plurality of cache entries at a cache stored in a computer memory, individual ones of the cache entries including respective computed data and a plurality of cost measures of different cost types, wherein for the individual one of the cache entries, respective ones of the cost measures of the different cost types represent respective different computing costs for respective different types of resources to generate the computed data for the respective cache entries;
   recording respective frequencies of access at which the respective individual cache entries are accessed;
   receiving an incoming cache entry to add to the cache, wherein the incoming cache entry has a plurality of cost measures of the different cost types included as part of the incoming cache entry;
   determining a cache entry to be evicted from the cache, comprising comparing respective total cost among respective ones of the cache entries to identify the cache entry whose respective total cost is lower than the respective total cost of others of the cache entries as the cache entry to be evicted from the cache, wherein the respective total cost for respective ones of the cache entries:
      is computed as one of the cost measures stored in the respective cache entry, that represents a currently constrained resource, combined with the frequency of access of the respective cache entry, or
      is based on a weighted combination of the plurality of cost measures, stored in the respective cache entry, combined with the frequency of access of the respective cache entry;
   removing the cache entry determined to be evicted from the cache; and
   writing the incoming cache entry, including the plurality of cost measures of the different cost types received from the application, into the cache stored in the computer memory.

2. The method as in claim 1, wherein one of the cost measures is based in part on at least one of: CPU (central processing unit) consumption, amount of I/O (input/output), bandwidth consumption, GPU (graphics processing unit) consumption, power consumption, networking resources consumed, consumption of resources from additional services, API (Application Programming Interface) calls to additional services, calls to other resources in a service provider environment, a time to generate the cache entry, or an actual cost to generate the cost entry, or weighted data attributes for computed data.

3. The method as in claim 1, wherein the cost measures are generated by an application that generates the cache entry.

4. The method as in claim 1, wherein the cost measure for a given cache entry is a weighted cost computed from the plurality of cost measures individually stored for the given cache entry and that are based on respective computing cost types.

5. The method as in claim 1, wherein the cache is a priority queue that is prioritized based on the cost measures of the cache entries.

6. The method as in claim 1, further comprising:
   generating a priority queue for at least one of the computing cost types;
   identifying the computing cost type that is currently constrained;

selecting a priority cache entry from the priority queue of the computing cost type that is currently constrained; and evicting the priority cache entry from the cache.

7. The method as in claim 1, further comprising:
storing evicted cache entries into a second level cache representing cache entries with a lower use frequency as compared to a first level of the cache; and
selecting cache entries in the second level cache for eviction based on a frequency of use.

8. The method as in claim 1, further comprising computing the respective total cost for each cache entry as product of the particular cost measure and the respective frequency of access, wherein rank in an eviction queue is based on the respective total cost.

9. The method as in claim 8, wherein the frequency of access is a record of the past access frequency or an inverse of a time since last access.

10. The method as in claim 8, further comprising ranking cache entries based on the respective total cost of individual ones of the cache entries.

11. The method as in claim 8, further comprising evicting a cache entry when a time to live (TTL) of a cache entry has expired.

12. A non-transitory machine readable storage medium including instructions embodied thereon, wherein the instructions, when executed by at least one processor:
store a plurality of cache entries at a cache in a computer memory, individual ones of the cache entries including respective computed data and a plurality of cost measures of different cost types, wherein for the individual one of the cache entries, respective ones of the cost measures of the different cost types represent respective different computing costs for respective different types of resources to generate the computed data for the respective cache entries;
record respective frequencies of access at which the respective individual cache entries are accessed;
receive an incoming cache entry to add to the cache, wherein the incoming cache entry includes a plurality of cost measures of the different cost types received from an application creating the cache entries;
identify a cache entry to evict from the cache, wherein the cache entry to be evicted has a total cost that is lower than the respective total cost for other ones of the cache entries, wherein respective total cost for respective ones of the cache entries:
 is computed as one of the cost measures, stored in the respective cache entry, that represents a currently constrained resource, combined with the frequency of access of the respective cache entry; or
 is based on a weighted combination of the plurality of cost measures, stored in the respective cache entry, combined with the frequency of access of the respective cache entry;
remove the cache entry identified to be evicted from the cache; and
write the incoming cache entry, including the plurality of cost measures of the different cost types received from the application, into the cache stored in the computer memory.

13. The non-transitory machine readable storage medium as in claim 12, further comprising instructions, that when executed by the at least one processor prioritize the incoming cache entry for eviction from the cache based on the cost measures for the incoming cache entry as compared to the cost measures of the other stored cache entries.

14. The non-transitory machine readable storage medium as in claim 12, further comprising instructions, that when executed by the at least one processor compute the total cost measure as a product of the particular cost measure and an expected frequency of access of the cache entry.

15. The non-transitory machine readable storage medium in claim 12, wherein receipt of the incoming cache entry with the cost measures further comprises:
prioritization of the cache entry in multiple priority queues associated with individual cost types for eviction from the cache.

16. A system, comprising:
at least one processor; and
at least one memory device including a data store to store data elements and instructions that, when executed, cause the system to:
store a plurality of cache entries at different levels of a multi-level cache stored in a computer memory, wherein individual ones of the cache entries include respective computed data and a respective plurality of cost measures of different cost types, wherein for the individual one of the cache entries, respective ones of the cost measures of the different cost types represent respective different computing costs for respective different types of resources to re-compute the computed data for the respective cache entries;
record respective frequencies at which respective individual cache entries are accessed;
receive a message with an incoming cache entry to add to the cache, wherein the incoming cache entry comprises a respective plurality of cost measures of the different cost types for the incoming cache entry;
identify an eviction cache entry which has a lower total cost, which is computed based on one or more of the respective cost measures combined with the respective frequency of access, as compared to the total cost for other cache entries in a particular level of the multi-level cache, in order to evict the eviction cache entry from the particular level;
remove the eviction cache entry determined to be evicted from the particular level of the multi-level cache, wherein an entry corresponding to the eviction cache entry is added to or remains in a higher level of the multi-level cache than the particular level; and
write the incoming cache entry, including the respective plurality of cost measures for the incoming cache entry, into the particular level of the multi-level cache stored in the computer memory.

17. The system as in claim 16, wherein the frequency of access is a record of past access frequency or an inverse of a time since last access.

18. The system as in claim 16, wherein the memory device further includes instructions that, when executed by the at least one processor, cause the system to evict cache entries that have a lowest total cost before evicting cache entries with a higher total cost.

19. The system as in claim 16, wherein the memory device further includes instructions that, when executed by the at least one processor, cause the system to insert a given cache entry into the cache in a priority ordering by determining a time until a total cost of the given cache entry will be below a lower bound.

20. The system as in claim 16, wherein the memory device further includes instructions that, when executed by the at least one processor, cause the system to evict a particular cache entry when a time to live (TTL) of the particular cache entry has expired.

21. A method, using one or more processors, comprising:
receiving an incoming cache entry that includes computed data and a cost measure to add to a cache of a plurality of cache entries in a computer memory, wherein respective ones of the cache entries store respective computed data and a respective cost measure that represents a computing cost to generate the computed data stored in the cache, and wherein individual cache entries have a respective time to live (TTL);
responsive to receiving the incoming cache entry, identifying a cache entry to be evicted from the cache to make room in the cache for the incoming cache entry, comprising:
determining that none of the cache entries has a respective TTL that is expired; and
responsive to the determination that none of the cache entries has a respective TTL that is expired, identifying the cache entry to be evicted that has a lower respective stored cost measure than the respective stored cost measure for other cache entries; and
replacing the identified cache entry to be evicted from the cache with the incoming cache entry.

* * * * *